UNITED STATES PATENT OFFICE.

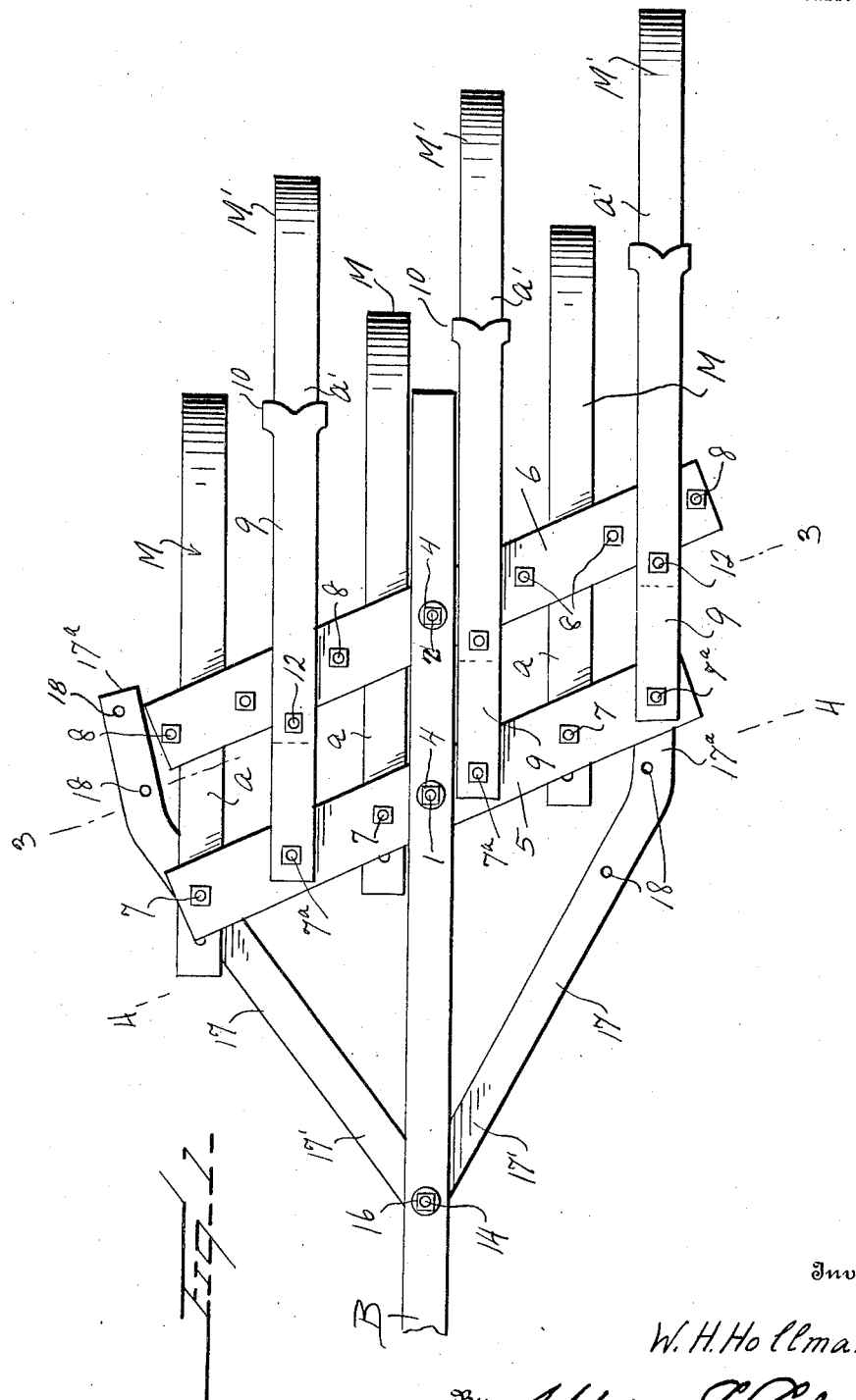

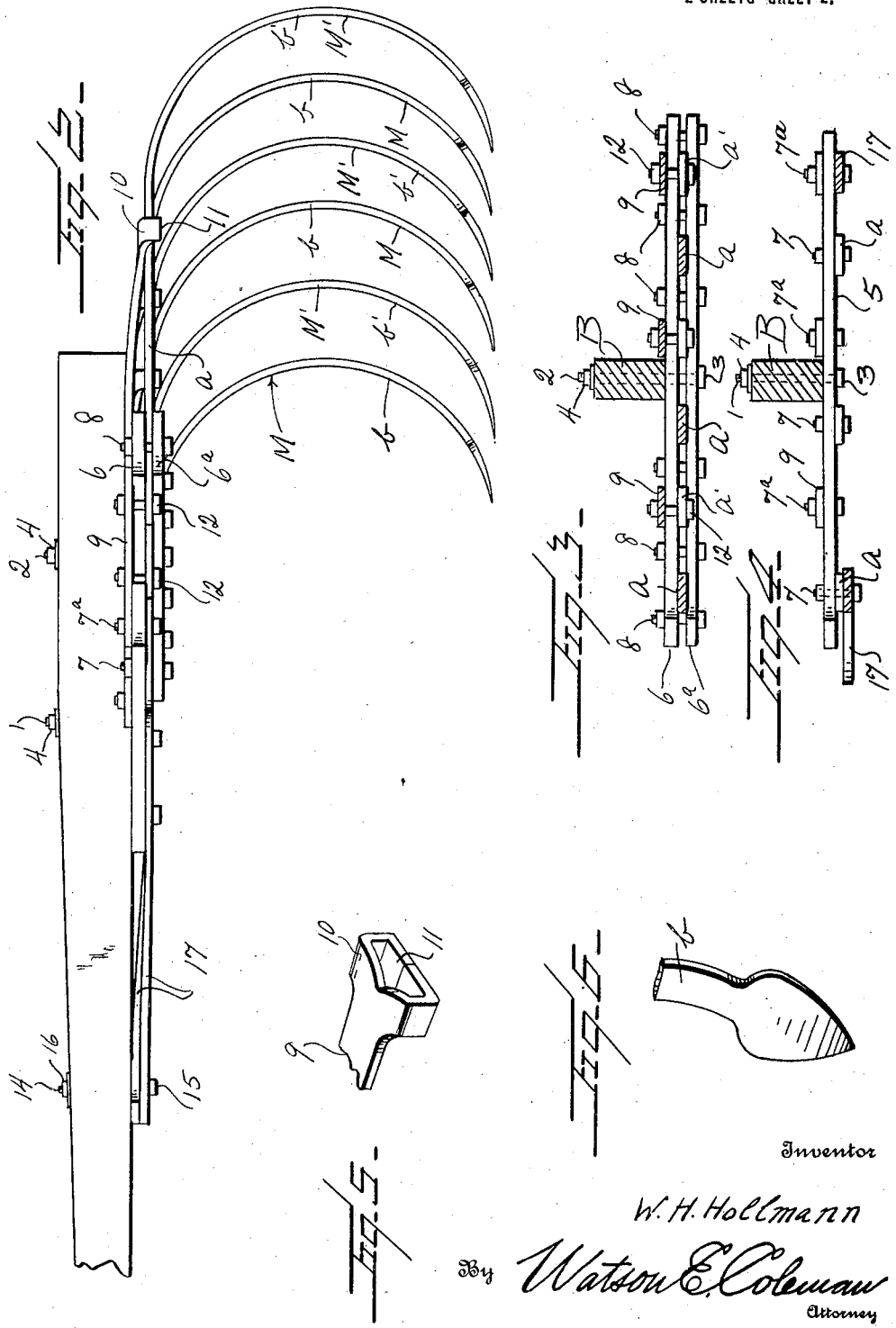

WILLIAM H. HOLLMANN, OF LORETTO, TENNESSEE.

FARMING IMPLEMENT.

1,358,742.  Specification of Letters Patent.  Patented Nov. 16, 1920.

Application filed June 16, 1920. Serial No. 389,516.

*To all whom it may concern:*

Be it known that I, WILLIAM H. HOLLMANN, a citizen of the United States, residing at Loretto, in the county of Lawrence and State of Tennessee, have invented certain new and useful Improvements in Farming Implements, of which the following is a specification, reference being had to the accompanying drawings.

This invention relates to certain improvements in farming implements and has relation more particularly to a device of this general character comprising a plurality of resilient ground working members assembled in gang, together with means whereby said ground working members may be relatively adjusted so that the implement may be employed with equal facility as a cultivator, weeder, side harrow, and the like.

It is also an object of the invention to provide a novel and improved device of this general character comprising a plurality of resilient ground working members and wherein certain of said members have coacting therewith means for bracing or reinforcing the same.

The invention consists in the details of construction and in the combination and arrangement of the several parts of my improved farming implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a farming implement constructed in accordance with an embodiment of my invention.

Fig. 2 is a view in side elevation of the device as illustrated in Fig. 1.

Fig. 3 is a fragmentary sectional view taken substantially on the line 3—3 of Fig. 1.

Fig. 4 is a fragmentary sectional view taken substantially on the line 4—4 of Fig. 1.

Fig. 5 is a perspective of the rear end of one of the brace members and

Fig. 6 is a view in perspective of the ground engaging extremity of one of the ground working members.

As disclosed in the accompanying drawings, B denotes a beam of any ordinary or preferred type and which has disposed through its rear portion, at longitudinally spaced points, the vertically directed bolts 1 and 2. The bolts 1 and 2 have their heads 3 downwardly directed and engaged with the upper end portions of said bolts and coacting with the top face of the beam B are the holding nuts 4.

The bolts 1 and 2 are also directed through the transverse or cross members 5 and 6, respectively, whereby said members are capable of swinging movement. The members 5 and 6 extend beyond the opposite sides of the beam B and are arranged in parallelism.

Disposed through the forward member 5 are a plurality of substantially equidistantly and longitudinally spaced bolts 7 and 7ª in alternate arrangement. Each of the bolts 7 is disposed through and serves as a pivot for the forward end portion of the rearwardly directed shank $a$ of a ground working member M, the rear portion of the shank $a$ being continued by the downwardly curved teeth $b$.

The shanks $a$ of the members M extend between the member 6 and a supplemental member 6ª underlying the member 6. The members 6 and 6ª are maintained in assembled relation by the bolts 8 or the like disposed through said members and in the assembly a bolt 8 or the like is spaced alternately from opposite sides of each of the shanks $a$, by which arrangement the members M have limited lateral swinging movement, one independently of the other, but at no time in interfering positions.

Secured to the bolts 7ª are the forward end portions of the elongated brace or reinforcing members 9, each of which constitute an elongated strap possessing a certain degree of inherent resiliency. The members 9 extend rearwardly and over the cross member 6 and the rear or opposite end portion of each of the brace or reinforcing members 9 is provided at its opposite sides with the extensions or arms 10 bent inwardly one toward the other below the brace or member 9, whereby a loop 11 is provided.

Disposed through each loop 11 is the shank $a'$ of the ground working member M'. The forward portion of the shank $a'$ extends between the cross members 6 and 6' and terminates in advance thereof and said forward portion of the shank $a'$ is secured to the brace or reinforcing member 9 immediately thereabove by the bolt 12 or the like. The opposite end portion of the shank $a$ is continued by the downwardly curved tooth $b$.

The members M and M' are preferably formed of metal possessing inherent resiliency so that during a working operation, said members will have the desired spring action to facilitate the work, and in the present assembly of the device it is to be noted that the teeth $b'$ of the members M' are arranged rearwardly of the teeth $b$ of the members M.

The shanks $a'$ alternate with the shanks $a$ and a bolt 8 hereinbefore referred to is arranged at opposite sides of each of the shanks $a'$, whereby said shanks $a'$ also have laterally swinging movement one independently of the other but at no time are said shanks $a'$ in interference with each other or with the shanks $a$.

Vertically disposed through the beam B at a desired point in advance of the cross member 5 is a bolt 14 or the like preferably having its head 15 downwardly disposed and which bolt 14 is maintained in applied position through the instrumentality of a holding nut 16.

Pivotally held by the lower portion of the bolt 14 are the forward end portions of the set levers or arms 17. The forward portions 17' of the levers or arms 17 are straight and are rearwardly disposed in divergence, while the rear portions $17^a$ of said levers or arms are disposed on an inward curvature. Each of the arms or levers 17 coacts with an end bolt 7 carried by the cross member 5 and said bolt is adapted to be disposed through one of the longitudinally spaced openings 18 produced in the rear portion of the coacting lever or arm 17, whereby the cross member 5 may be held in desired adjustment about the bolt 1.

The bolts 12, upon swinging of the members 5, have requisite engagement with the forward longitudinal edges of the members 6 and $6^a$, whereby said members 6 and $6^a$ are caused to move in unison with the member 5 so that the member 5 and the members 6 and $6^a$ are substantially in parallelism irrespective of their adjusted positions.

From the foregoing description it is thought to be obvious that a farming implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A cultivator comprising, in combination, a beam, a pair of cross members extending on opposite sides of the beam and pivotally engaged therewith, said cross members being substantially in parallelism, means coacting with one of the cross members for holding the same against movement about its pivot, ground working members provided with shanks pivotally engaged with the forward cross member and extending across the second cross member, said second cross member being provided with means for limiting the swinging movement of the ground working members about their pivotal connection with the forward cross member, rearwardly disposed brace members pivotally engaged with the forward cross member and extending rearwardly over the second cross member, and ground working members provided with shanks underlying the rear cross member and secured at their forward ends to the brace members at a point in advance of the rear cross member, the rear end portions of the brace members being slidably engaged with the rear portions of the shanks of said last named ground working members, said last named ground working members extending rearwardly of the first named ground working members.

2. A cultivator comprising, in combination, a beam, a pair of cross members extending on opposite sides of the beam and pivotally engaged therewith, said cross members being substantially in parallelism, means coacting with one of the cross members for holding the same against movement about its pivot, ground working members provided with shanks pivotally engaged with the forward cross member and extending across the second cross member, said second cross member being provided with means for limiting the swinging movement of the ground working members about their pivotal connection with the forward cross member, rearwardly disposed brace members pivotally engaged with the forward cross member and extending rearwardly over the second cross member, ground working members provided with shanks underlying the rear cross member and secured at their forward ends to the brace members at a point in advance of the rear cross member, the rear end portions of the brace members being slidably engaged with the rear portions of the shanks of said last named ground working members, and means carried by the rear cross member for limiting the swinging movement of the brace members about their pivotal connection with the forward cross members.

3. A cultivator comprising, in combination, a beam, a pair of substantially parallel cross members extending on opposite sides of the beam and pivotally engaged therewith, means coacting with one of the cross members for holding the same against movement about its pivot, ground working members provided with shanks pivotally engaged with the forward cross member and extending across the second cross member and adjustable laterally thereof, rearwardly disposed brace members pivotally engaged with the forward cross member and extending rearwardly across the second cross member, and other ground working members of greater length than the first named ground working members provided with shanks underlying the rear cross member and secured at their forward ends to the brace members at a point in advance of the rear cross member, the rear end portions of the brace members being slidably engaged with the rear portions of the shanks of said last named ground working members, said first named ground working members and second named ground working members being alternately arranged.

4. A cultivator comprising, in combination, a beam, a pair of substantially parallel cross members extending on opposite sides of the beam and pivotally engaged therewith, means coacting with one of the cross members for holding the same against movement about its pivot, ground working members provided with shanks pivotally engaged with the forward cross member and extending across the second cross member and adjustable laterally thereof, rearwardly disposed brace members pivotally engaged with the forward cross member and extending rearwardly across the second cross member, and other ground working members of greater length than the first named ground working members provided with shanks underlying the rear cross member and secured at their forward ends to the brace members at a point in advance of the rear cross member, the rear end portions of the brace members being slidably engaged with the rear portions of the shanks of said last named ground working members, said first named ground working members and second named ground working members being alternately arranged, said second named ground working members being likewise laterally adjustable upon said rear cross member.

5. A cultivator comprising, in combination, a beam, forward and rear substantially parallel cross members pivoted intermediate their ends to the beam, means coacting with one of the cross members for holding the same against movement about its pivot, said rear cross member being provided with a coacting supplemental member vertically spaced therefrom, ground working members provided with shanks pivotally engaged with the forward cross member and extending intermediate the rear cross member and the supplemental member thereof, rearwardly disposed brace members pivotally engaged with the forward cross members and alternated with relation to said ground working members, said brace members having their rear ends extending rearwardly to one side of said rear cross member, other ground working members provided with shanks extending intermediate the rear cross member and the supplemental member thereof and having their forward ends secured to the brace members at a point in advance of the rear cross member and rearwardly disposed with relation to said forward cross member, the rear end portions of the brace members being slidably engaged with the rear portions of the ground working members, and securing means extending through said rear cross member and the supplemental member thereof intermediate and transversely spaced from the shanks of the ground working members, said last named ground working members extending rearwardly of the first named ground working members.

In testimony whereof I hereunto affix my signature.

WILLIAM H. HOLLMANN.